(No Model.) 3 Sheets—Sheet 2.
J. P. STABLER.
SIGNAL TRANSMITTER FOR TELEPHONE CALLS.
No. 265,455. Patented Oct. 3, 1882.
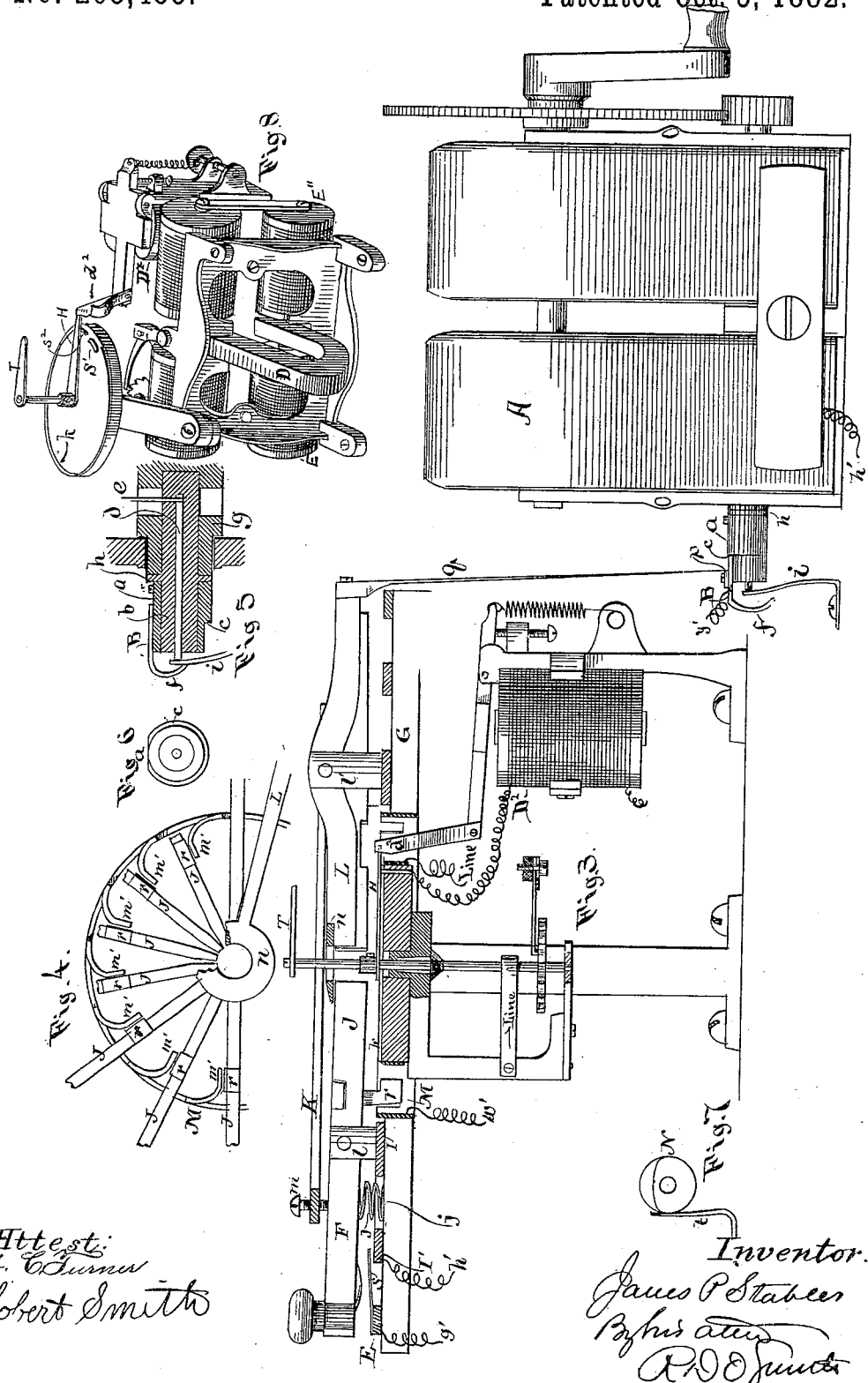
Attest:
J. C. Turner
Robert Smith
Inventor:
James P. Stabler
By his atty
R. D. O. Smith (No Model.) 3 Sheets—Sheet 3.
J. P. STABLER.
SIGNAL TRANSMITTER FOR TELEPHONE CALLS.
No. 265,455. Patented Oct. 3, 1882.
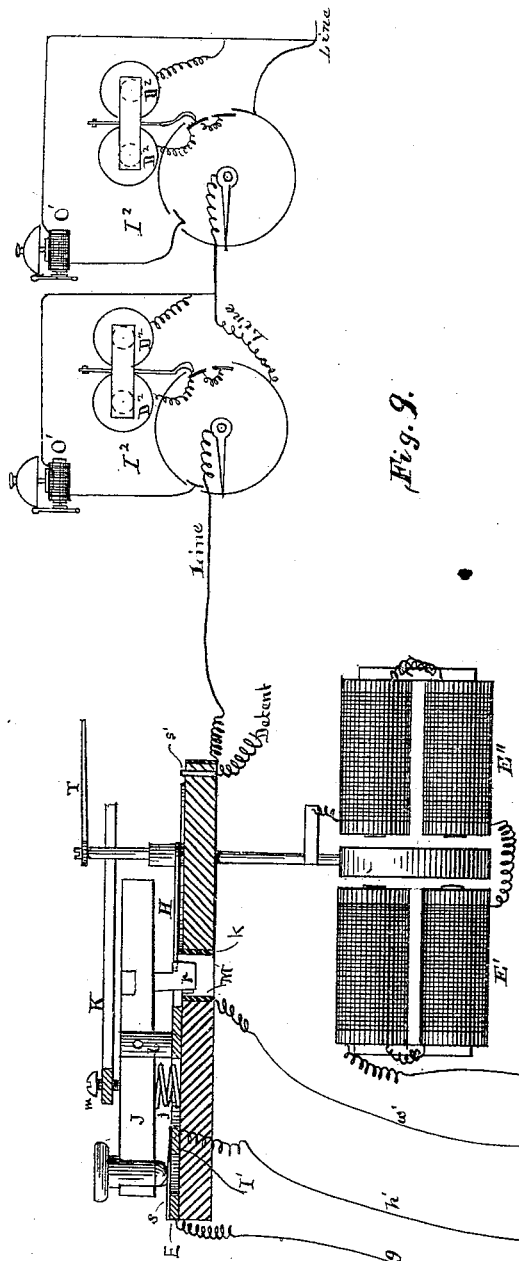
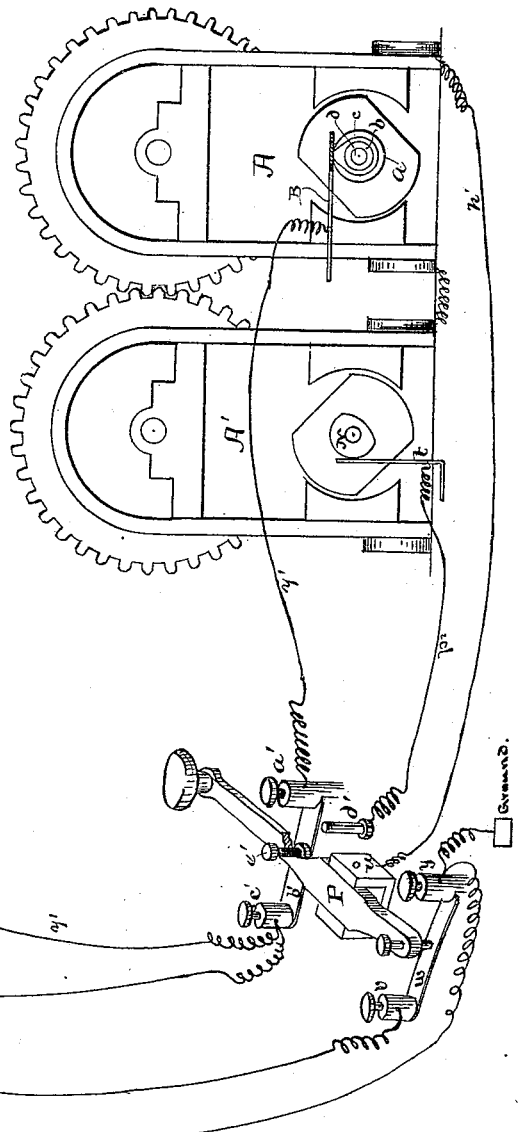
Fig. 9.
Attest:
Robert Smith
Moses Froskey Jr.
Inventor:
James P. Stabler
By his atty
R. W. O. Smith

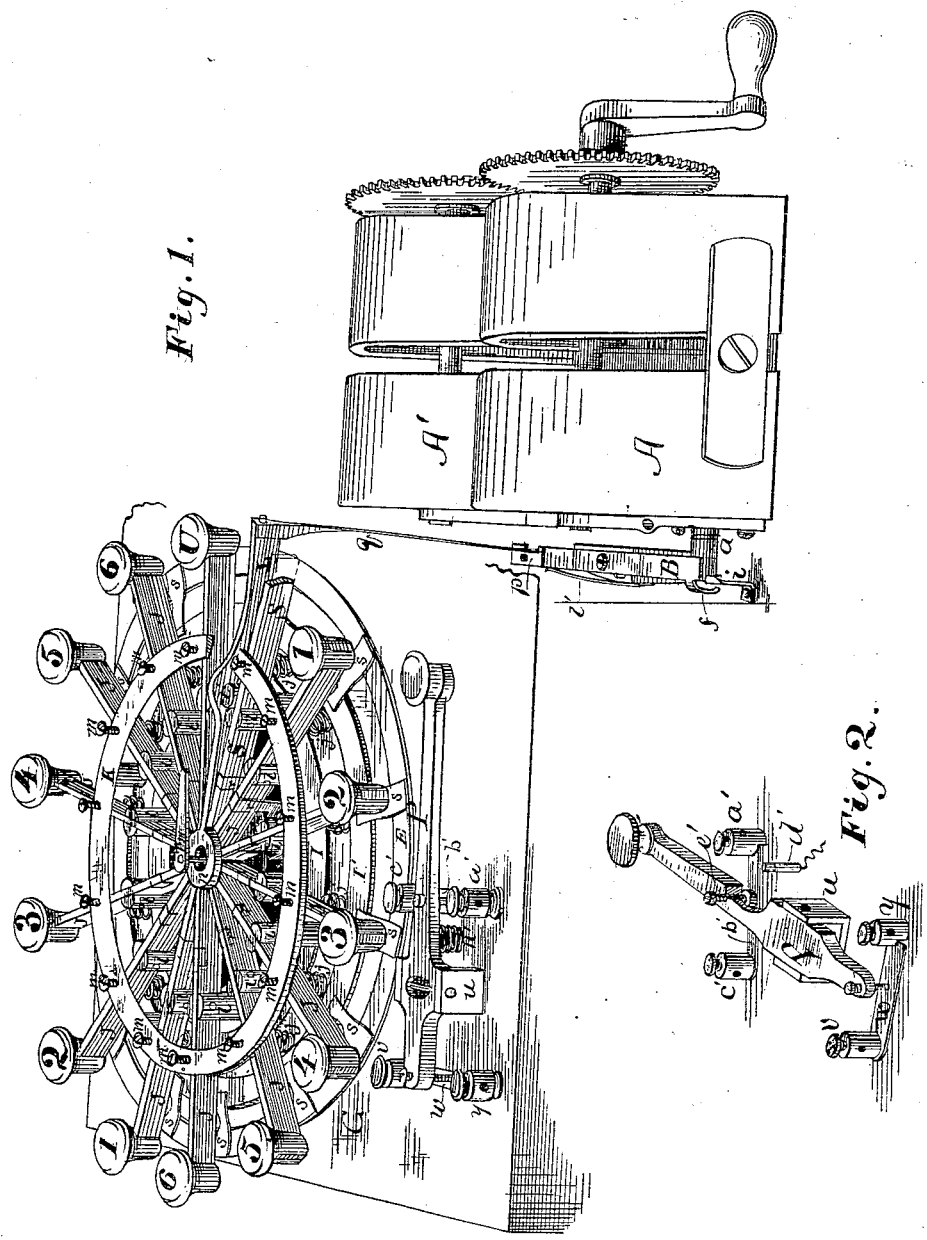

UNITED STATES PATENT OFFICE.

JAMES P. STABLER, OF SANDY SPRING, MARYLAND.

SIGNAL-TRANSMITTER FOR TELEPHONE-CALLS.

SPECIFICATION forming part of Letters Patent No. 265,455, dated October 3, 1882.

Application filed January 27, 1882. (No model.)

*To all whom it may concern:*

Be it known that I, JAMES P. STABLER, of Sandy Spring, Montgomery county, in the State of Maryland, have invented a new and useful Improvement in Combined Key-Board, Automatic Switch, and Commutator for Telephone-Calls; and I do hereby declare that the following is a full and accurate description of the same.
The instrument shown and described in my Patent No. 235,058, November 30, 1880, is provided with a pole-changing key, two electro-magnets of opposite polarity, a vibrating armature, and a pawl and ratchet actuated thereby, whereby a revolving index in the electric line is rotated to bring it to a position corresponding with the station-shunt. Said pole-changing key is operated solely by the attendant, and therefore the index can be moved only so fast as said key can be operated. In the use of said pole-changing key the operator is required to determine the time to arrest the index by counting or observing its position, and diverted attention may result in a miscount and a necessary repetition of the operation. In that instrument the index is moved one station by one forward and one backward movement of the vibrating armature, produced by one current in each direction from the generator. For convenience hereinafter I will designate the forward or first operative current "positive," the backward or last operative current "negative."

The object of my invention is to substitute an automatic pole-changer for the manual one above mentioned, and a positive station-stop for a stop depending upon the momentary observation of the operator, so that the manual duty of the operator is limited to the depression of the proper station-key, and holding it down until the index is automatically brought around to the proper point and automatically arrested. By this means the instrument is operated in less time and with less margin for inaccuracy. In connection with this improved key-board I propose to employ a station-instrument the same as or similar to that described in my patent above mentioned, and to actuate the indexes of said station-instruments by a ratchet-and-pawl movement similar to or like that described in said patent. It will therefore be unnecessary to describe herein the particular structure of any part of the instrument, except that pertaining to the key-board and the commutators connected therewith.

In addition to the advantages as to time and accuracy set forth above, this invention makes it entirely practicable to substitute the ordinary magneto-generator for the troublesome and expensive voltaic battery used by many exchanges, and at the same time retain all the advantages of an individual call, and eliminate the great objection to the exclusively magneto system for combination lines—viz., the absence of a definite indication by which the subscribers may know whether the line is in use or not as between stations on the same line.

My invention principally consists in a system of station-keys, each provided with an index-stop arranged with relation to a circuit-closing lever common to them all, whereby the depression of either one of said keys will close the circuit with the source of electric energy, and thereby cause the mechanism which operates the indexes to be automatically actuated, and causes said index to move until arrested by the station-key stop, when the actuating-current will be short-circuited through said stop and key, and the line thus cut out, so that the station-indexes will come to rest. Therefore the operator is simply required to depress the proper station-key and hold it down until the index has automatically traveled around to it and has been arrested by it.

Having now set forth in general terms the nature and object of my invention, I will particularly describe the structure of it which I prefer, having reference to the accompanying drawings, wherein—

Figure 1 is a perspective view of my key-board. Fig. 2 is a perspective of the re-enforce key detached. Fig. 3 is a longitudinal section. Fig. 4 is a plan of a part of the relief-ring. Fig. 5 is a longitudinal section of the axis of the generator. Fig. 6 is an end view of the same. Fig. 7 is an end view of the axis of the re-enforce generator. Fig. 8 is a perspective showing the operative mechanism of the index and dial of local-station instrument. Fig. 9 represents the several electrical connections and station-instruments in series.

A and A' are the magneto-generators, which I propose to employ for a source of electric energy, though I do not propose to be confined to their use, because for operating my key-board it is immaterial from what source the electricity is derived. Supposing the magneto-machines to be employed, the only peculiarity connected with them is the structure of the circuit-closer, which takes the place of the ordinary commutator. The end of the axis $g$ of the revolving armature is perforated axially, and a plug, $b$, of insulating material, is inserted therein, and in the center of said plug a conductor-pin, $d$, is inserted and put in electrical connection with one terminal of the armature-helix. The plug $b$ extends beyond the end of the axis $g$, and a metallic sleeve, $a$, is fitted thereon, but prevented from contact with the axis $g$ by an insulating-rib, $h$. One portion of the sleeve $a$ is cylindrical, and another part constitutes a cam, as shown in Figs. 5 and 6, a shoulder, $c$, being interposed between the cylindrical and cam portions. A plate, B, is pivoted at a point near the center, so as to be capable of vibration in a plane parallel with the axis of the revolving armature, and when in normal position one end of it rests upon the sleeve $a$ outside of the shoulder $c$. A spring, $i$, tends to retain said plate in normal position. When pressed to move upon its pivot it will be arrested by said shoulder until in the revolution of the armature the plate B is enabled to pass said shoulder and slide over upon the other portion of the sleeve. When arrested by the shoulder $c$ the plate B is out of contact with the conductor-pin $d$; but when it is permitted to slide past said shoulder, then it may close contact with said pin and establish an electrical circuit through the instruments and the line. A spring, $i$, in constant contact with the pin $d$, and a lip, $f$, on the plate B, is a convenient means to form connection with said pin, and thus the plate B becomes a "circuit-closer," and is herein referred to by that term.

When electrical connection has been made with the generator, as set forth above, the current is thrown upon the instruments of the call; but it is necessary for their uniform and proper working that the initial current which moves the indexes shall always be of one polarity and of full strength and duration, because it is practically impossible to make similar instruments which will not vary from each other in resistance to motion, and an excess of motive power is therefore required. Hence if the initial or positive operative current is of less than full duration and strength it may happen that a number of the instruments on the line will advance one full movement, while others will fail to do so. They will then be out of unison, and two bells will be in circuit at once. To guard against this contingency, the sleeve $a$ is so adjusted that whenever the plate B closes contact the armature shall be in position to give the initial current from the negative side, and therefore non-operative. Thus after closing contact the first operative current will come when the pole is next changed, and therefore will be of full strength and duration. This is the purpose of the sleeve $a$ with its shoulder $c$, which will only permit contact to be made when the armature is in a predetermined position, and the initial current will always be the one due to that position of the armature. After electrical contact has been made the poles are changed with each semi-revolution of the armature, and the currents are to and fro. These currents are conducted to the magnets E' E'' by the conductor $y'$. The armature D is thereby caused to vibrate between the magnets E' E'' and the index H to move with a rapidity corresponding to the velocity of revolution of the revolving armature, and the vibration is continued so long as the current continues to flow.

The system of keys comprises a base, G, which for convenience should be composed of non-conducting material. A circular orifice is made in said base to admit the index-hand H and the rim $k$, which, when in position, are in the plane of the upper surface of said base. A series of metallic posts, $l$, are set in said base in a circle, and a corresponding series of key-levers, J, are pivoted to said posts radial as to the axis of the central opening. For convenience said posts are set upon a ring, I, which is secured to the base G around the central opening. Each key is provided with a spring, $j$, or other means of returning the key when released to normal position out of contact with the ring E.

Above the keys J there is a stop-ring, K, with adjustable stops $m$, whereby the upward movement of each key may be limited and the whole set adjusted to uniformity of position. A secondary lever, L, is interposed in this system to operate the circuit-closer B on the line. It is pivoted to the post $l'$, but it is adjusted so that it does not at any time make contact with the ring E. At its inner end the lever L is provided with a small ring or annulus, $n$, concentric with the axis of the index H and overlapping the several inner ends of the keys J, so that whenever one of said keys J is depressed at its outer end it will raise the inner end of the lever L. The outer end of the lever L is provided with an arm, $q$, (which I find it convenient to make elastic,) and the lower extremity of said arm rests against the outer end of the vibrating plate B, but insulated therefrom by an interposed piece, $p$, of insulating substance. Therefore whenever one of the keys J is depressed at its outer end the lever L will also be depressed at its outer end, and consequent pressure of the arm $q$ against the circuit-closer B will cause it to close connection with the pin $d$, when in the revolution of the armature said circuit-closer can move past the shoulder $c$. The current will then be closed on the call-instruments in the line.

Each key J is provided with a pendent hook-shaped stop, $r$, which, when said key is in normal position, is out of the path of the index H; but when said key is depressed at its outer end said stop is brought to a position directly in the path of said index, and the same is arrested thereby, and the current is short-circuited. For this purpose the keys have a ground-connection; but the preferable arrangement of this connection will be hereinafter explained. The line is thereby cut out, so that all the station-indexes immediately come to rest. I consider it of practical advantage to provide two break-points in the circuit, one in the ground-circuit and another at the circuit-closer B, because it is important that when the key J is released the circuit shall be broken with certainty before the index has parted from the stop $r$, to obviate the possible return of the current to the line sufficiently long to move the station-indexes forward, and thus throw the desired bell out of circuit before the call could be made by the use of the intensity-key P.

It will appear evident that the circuit-closer B will be less rapid in its movements than the key J, and that without a break at said key the circuit might not always be opened with sufficient quickness. I have therefore provided a ring, E, which is secured to the base G under the outer ends of the keys J, and said ring is provided with a ground-connection wire, $g'$. When the key J is depressed it makes contact with said ring, and then, when the index is arrested by the stop $r$, the current is short-circuited by way of said key and ring. It is important, however, that the key J shall not form a part of the ground-circuit from the generator, otherwise when the index is in contact with the stop $r$ the circuit will not be broken by breaking contact between said key and ring. I therefore employ another ring, $I'$, concentric to ring E, and by wire $h'$, I connect said ring $I'$ with the generator, and a contact-spring, $s$, is placed over said rings under each key J, so that the ground-circuit between said rings will be closed by the depression of said spring whenever the key J is depressed. This makes the ground-circuit independent of the electrical connections of said keys. When the line and all its resistance are thus cut out the electrical tension in the central-office instrument is correspondingly increased. Each stop $r$ is elastic or movable, so that it may yield under the index-pressure, and thereby be brought into contact with a point, $m'$, projecting from the relief-ring M, which is in electrical contact by means of the wire $w'$ with the line-circuit at a point intermediate between the generator and the motor-magnets, and also in temporary electrical contact with the ground-ring E by way of the keys J and the contact-springs $s$, one of which is placed beneath each key J, so that whenever one of said keys is depressed to close the circuit with the ring E the ring $I'$ is at the same time closed with the ground-connection. The current is thus momentarily shunted to the ground, and the central-office instrument, as well as the line, is thereby cut out.

In the apparatus described in my patent above mentioned the motive power capable of moving the index into position is inadequate to operate the bell, and after moving the index to the required position a current of greater strength is sent over the line to operate the bell. In this invention the stronger current is derived from the generator $A'$, which is more powerful than the generator A, and has upon the shaft of its armature a make-and-break commutator, consisting of a cylindric segment, N, (shown in Fig. 7,) which, during a part only of each revolution, is in contact with the conductor $t$, and therefore takes off currents of one polarity only.

The mechanical details of the structure and arrangement of parts herein described may be greatly varied without departing from the mode of operation set forth, and I therefore do not wish to limit myself to said details.

As will have appeared from the foregoing, the ordinary operation of moving the station-indexes simultaneously is effected by the current derived from one generator or set of generators, and the ringing of the call-bell is effected by a stronger or re-enforced current derived from a separate or additional source of electricity. The first object is attained through the office of the keys J. The second requires the use of a second key, which controls the re-enforced or stronger current.

In the drawings, P is the re-enforce or intensity key, and electrical connections are arranged as follows: The axis-post $u$ of said key and the binding-post $v$ are in the ground-circuit, which conveniently extends from the frame-work or one terminal of the generator—for convenience suppose it to be the negative—to the ring $I'$, or, when the spring $w$ is in contact with the binding-post $y$, direct to the ground. The post $y$ is also in the ground-line $g'$ from the ring E. The post $a'$, spring $b'$, and post $c'$ are in the line $y'$ from the circuit-closer B to the motor-magnets $E'$ $E''$. The short-circuit wire $w'$ from the relief-ring M to the line may conveniently join the line at the post $c'$. The conductor $p^2$ from the commutator N of the generator $A'$ is connected with a pin, $d'$, which closes contact with spring $b'$ when it breaks contact with the post $a'$, and thereby when the line from the generator A is broken at the post $a'$ it is formed again at the pin $d'$ from the generator $A'$, from which the re-enforce or stronger current is derived, and thereby the bell or unison detent-magnets are actuated. A spring, $n'$, (see Fig. 1,) keeps the key P always in normal position except when depressed by the operator. For convenience in getting a ground-connection for the generator $A'$ similar to the ground-connection of generator A, the frame of $A'$ is connected with the frame of A, as shown at $q'$. The key P therefore at one end comes in contact with the spring $w$, and keeps the same out of contact with the post $y$ as a normal position. At the other end said key is provided with an insulated pin, $e'$, which, when said key is depressed, pushes the spring $b'$ out of contact with $a'$ and makes contact with $d'$. Thus when a certain station is to be called the operator depresses the key J which bears the number of that station, and the current is turned onto the line through all the station-instruments, and the indexes simultaneously move until the index H is arrested by the stop $r$, and the current is thereby grounded. The key J is then released, and the circuit is thereby broken at ring E and at the circuit-closer B, whereby all the instruments are cut out before the stop $r$ has parted from the index H. The object of this is to hold the index in contact with a ground-connection until after the circuit has been surely broken, and thereby prevent a possible movement of the station-instruments by the remnant of the current passing at the moment the contacts are being broken. The stop $r$ is therefore made with sufficient surface to insure engagement with the index until after the rupture of electrical contacts, as set forth. The key P is then depressed, whereupon the re-enforce or stronger current from the generator A' passes on the line and to the station bell-magnets O' or to the detent-magnets $D^2$ of the station-instruments $I^2$, whereby said bell is sounded or the detents $d^2$ are tripped.

As was clearly shown in my patent above named, the several station-instruments were in circuit when their several indexes were upon the unison-shunts, and when in that position only could communication be had between two stations upon the same line; but when two stations are thus in communication all other stations on that line are also in circuit, and there is no means for indicating to said other stations that the line is in use. Consequently while a person is in communication with another on the same line he is constantly liable to interruption.

It is a desideratum that stations on the same line shall have notice of occupancy; and I have therefore provided an indicator-shunt, to which all the indexes are moved when the line is in use, whereby all stations on the line have visual notice that the line is occupied. For this purpose a shunt, S', similar to the detent or unison shunt $S^2$, and also in the line-circuit, is provided for each station-instrument, and I find it convenient to place it adjoining the unison-shunt, although that position is not imperative. The key S is appropriated to the shunt S', and when two stations on the same line are put in communication the attendant at the central office by depressing the key S brings all the indexes H around to said indicator-shunt, and leaves them there until the communication has terminated, when the indexes are again brought round to the unison-shunt and remain there until the line is again wanted.

The several station-instruments are in circuit while the indexes are on the indicator-shunts the same as when they are on the unison-shunts, but the position of the index indicates that the line is in use. In the central-office instrument the index H is concealed, in a great measure, by the keys J, and its axis is therefore extended up through the ring $n$, and a pointer, T, is mounted upon it, so that the operator can always see the position of the index. In the local-station instruments the pointer T may be omitted.

Having described my invention, what I claim as new is—

1. A moving index, actuating electro-magnets for the same, and a circuit-closer in the electric line, combined with a series of station-stops having ground-connections to arrest the movement of said index, short-circuit the current, and cut out the line, and means whereby said circuit-closer may be controlled.

2. A moving index, actuating electro-magnets, and a circuit closer in the electric line, combined with a series of station-keys and a corresponding series of station-stops having ground-connections controlled severally by said keys to arrest the movement of said index, and means whereby said keys severally control said circuit-closer, so that when either station-key is moved the circuit will be closed and said index will be moved until arrested by the corresponding station-stops, and the current thereby short-circuited and the line cut out.

3. The moving index H and its motor-magnets in the electric line, combined with a key, J, and stop $r$, and ground-connections for the same, and a circuit-closer, whereby when said key is depressed the line-circuit is closed on the generator, the index H, automatically moved to and arrested by the stop, and the current then short-circuited, as set forth.

4. A system of station-keys arranged radial to the axis of the index H and the stops $r$ on said keys, and a ground-ring, E, combined with a lever, L, adapted to be operated by either one of said station-keys, a circuit-closer on the generator-line, and means whereby said lever L is connected with said circuit-closer and operated by the same.

5. A generator, a circuit-closer in the line-conductor therefrom, moving index, which also forms a part of the line, a key having a ground-connection, a stop to arrest said index and short-circuit the current to the ground, and means whereby the motion of said key will also operate the circuit-closer.

6. A generator, a circuit-closer on the line-conductor therefrom, a lever, L, connected with and controlling said circuit-closer, and an annulus, $n$, fixed on the inner extremity of said lever, combined with the station-keys J, arranged radially to the axis of said annulus, motor-magnets, and a revolving index in the line-circuit.

7. A local-call key-board for a telephone-line, provided with an outer contact-ring, E, having a ground-connection, and the station-keys J, pivoted to the posts $l$ and radial to an axis common to all said keys, stops $r$, mounted on said keys, a lever, L, in several and joint connection with said keys, so as to be operated by either and all of the same, a revolving index, and conductor-rim in the line-circuit, the axis of said index being coincident with the axis of the key-board, whereby when said index is arrested the current is short-circuited through the ring E to the ground.

8. A local-call key-board comprising a series of keys, each one whereof has a ground-connection contact when depressed, and elastic stops to arrest the moving index, and thereby short-circuit the current and cut out the line, combined with a relief-ring, M, with its contact-points $m'$ and temporary ground-connection, whereby the electrical tension in the index-instrument is relieved, as set forth.

9. The radial keys J with contacts $s$, with ring E for a temporary ground-connection, the yielding stops $r$, and the revolving index H in the line-circuit, combined with the relief-ring M and its points $m'$, ground-ring E, and the contact-springs $s$, controlled by the keys J, as set forth.

10. The revolving index H and radial keys J, with the stops $r$, combined with the extended axis and pointer T above the keys, as set forth.

11. The revolving index H, conductor-rim $k$, and unison-shunt in the line-circuit, combined with the secrecy-shunt, also in the line-circuit, but located so as to place the indexes out of normal position of rest, as set forth.

12. An electrical generator automatically producing to and fro currents, and a circuit-closer on the line, combined with means whereby said circuit-closer is automatically controlled and permitted to close only when currents of the some polarity may be obtained.

13. The revolving axle or bearing for the magneto-generator A, with the insulated cylinder and cam-sleeve $a$, having the shoulder $c$ interposed between said cam and cylinder, combined with a sliding circuit-closer, which is arrested and held out of electrical contact by the shoulder $c$ until the revolving armature has reached a predetermined position, as set forth.

14. In a telephone-line, a series of call-instruments, with moving indexes and motor-magnets in the line, and local shunts or switches, combined with a magneto-generator of electricity and a circuit-closer adjusted to close only when the revolving armature has arrived at a certain predetermined position, as set forth.

15. The circuit-closer B, with its spring $i'$ and insulator $p$, combined with the lever L and its elastic arm $q$, as set forth.

16. The lever L, with its elastic arm $q$, combined with the circuit-closer B and the adjustable insulated sleeve $a$, provided with cylindric and cam surfaces and interposed shoulder $c$, as set forth.

17. A series of call-instruments and a magneto-generator to operate the local switches of said instruments, combined with an intensity-key, P, contact-points $a'$ and $d'$, and a magneto-generator, A', and its single-current commutator, N, whereby the circuit may be shifted from the one generator to the other, for the purpose set forth.

18. A call-instrument actuated by an electro-magnet, combined with a magneto-generator and a circuit-closer adjusted to close the circuit only at a point in the revolution of the armature when the negative current is being generated, as and for the purposes set forth.

19. A series of call-instruments on a line-circuit, a generator of electricity, and a circuit-closer on the line, combined with a series of moving indexes, also in the line, station-keys, also having ground-connections, automatic stops to arrest said indexes in positions corresponding to the station-switches and cut out the line by short-circuiting through the stop, and a secondary circuit-closing lever, L, adapted to be operated by any one of said keys.

20. The intensity-key P, the axis whereof is in the ground-circuit, the spring $b'$, with which the key is in insulated contact, and the post $a'$, in combination with the contact-point $d'$ and the line-connections to the generators A A'.

21. A series of call-instruments operated by electromotor-magnets, and call-bells requiring stronger electric currents to operate them than is required by the indexes, combined with generators A and A', of different powers, and the intensity-key P, whereby the current from either of said generators may be thrown upon the line.

JAMES P. STABLER.

Witnesses:
 J. C. TURNER,
 R. D. O. SMITH.